United States Patent Office 3,642,991
Patented Feb. 15, 1972

3,642,991
ALUMINUM CALCIUM GLUCONATE COMPLEX OF TETRACYCLINE ANTIBIOTIC FOR PARENTERAL USE
George Madison Sieger, Montvale, James Elwood Krueger, New City, and William Charles Barringer, Pearl River, N.Y., assignors to American Cyanamid Company, Stamford, Conn.
No Drawing. Continuation-in-part of application Ser. No. 742,702, July 5, 1968, which is a continuation-in-part of application Ser. No. 559,073, June 21, 1966. This application Sept. 24, 1969, Ser. No. 860,825
Int. Cl. A61k 21/00
U.S. Cl. 424—227                  3 Claims

ABSTRACT OF THE DISCLOSURE

A dosage unit form is described containing a therapeutic dose of an aluminum calcium gluconate complex of a tetracycline antibiotic, with a product which releases free glyceraldehyde in solution, such as glyceraldehyde, its dimer and addition salts. The solutions, when used intramuscularly and intravenously, result in blood levels of the tetracycline antibiotic which rise much more rapidly than the same doses without glyceraldehyde.

CROSS REFERENCE TO RELATED APPLICATIONS

This application is a continuation-in-part of our copending application Ser. No. 742,702, filed July 5, 1968, now abandoned, which is a continuation-in-part of our application Ser. No. 559,073, filed June 21, 1966, now abandoned.

BRIEF SUMMARY OF THE INVENTION

This invention relates to novel liquid compositions of tetracycline antibiotics which are suitable for parenteral administration. More particularly, the invention relates to stable liquid parenteral solution of aluminum calcium gluconate complexes of tetracycline antibiotics containing glyceraldehyde or a product which releases free glyceraldehyde in solution. The broad spectrum tetracycline antibiotics which may be employed in the practice of the present invention are tetracycline, 7-chlorotetracycline, 5-hydroxytetracycline, 6-demethyltetracycline, 7 - chloro-6-demethyltetracycline, 6 - deoxytetracycline, 6-deoxy-6-demethyltetracycline, 6-deoxy - 6 - demethyl-6-methylenetetracycline and 7-dimethylamino-6-deoxy - 6 - demethyltetracycline.

DETAILED DESCRIPTION OF THE INVENTION

One of the modes of administration of the tetracycline antibiotics is intramuscular injection which is used, for example, for severely ill and hospitalized patients. For this purpose it is of importance to achieve high blood levels as soon as possible after injection so that a prompt effect of the antibiotic can be obtained. A similar statement can be made for intravenous administration. Blood levels are usually investigated for such antibiotic formulations by tests in dogs as this correlates closely to the results obtained in human beings.

According to the present invention, formulations of tetracycline antibiotics as aluminum calcium gluconate complexes are made with a source of soluble glyceraldehyde. It is only necessary for the purpose of this invention that the particular glyceraldhyde source used release free glyceraldehyde when in solution. Thus, the glyceraldehyde may be added per se, or as the dimer, trimer, or other physiological acceptable form which when in solution releases free glyceraldehyde such as the sodium bisulfite addition salt. For instance, when in solution, the dimer is in equilibrium with free glyceraldehyde. For convenience all these forms are hereinafter referred to as glyceraldehyde.

Therapeutically useful dosages of the formulations of this invention may contain other useful ingredients known in the art such as antioxidants and preservatives. The antioxidant added could be sodium bisulfite, sodium formaldehyde sulfoxylate and the like. Suitable preservatives such as methylparaben and propylparaben may be added.

The aluminum calcium gluconate complexes used in this invention may contain from 1 to 4 moles of aluminum per mole of the antibiotic, from 1 to 5 moles of calcium per mole of the antibiotic, and from 1 to 12 moles of gluconic acid per mole of the antibiotic. The exact characteristics of the complexes vary, depending upon the antibiotic being employed. Variations in the molar ratios of the components cause variations in the apparent characteristics.

The complexes may be most conveniently formed in aqueous solution. The antibiotic, the aluminum, and the gluconic acid may be added in any form which will release the antibiotic, the aluminum ions, and the gluconate ions for complex formation. It is preferred that the aluminum ions first react with the gluconate ions, and then the antibiotic be added to this reaction product. The complex forming cations of calcium may then be added in the form of the oxide, hydroxide, or soluble salts. The complex may be used in the aqueous solution in which formed or it may be recovered from the solution by diluting it out with a water-soluble organic solvent in which the complex is insoluble, or by evaporation of the water. If the complex is formed in a high concentration it may precipitate out on standing. When desired, the components may be admixed in the proper proportions as a dry formulation to which water may be added in order to obtain the complex in aqueous solution. The aluminum may be added as an alkoxide. Aluminum isopropoxide and aluminum ethoxide are particularly convenient. Other forms of aluminum such as aluminum citrate, aluminum nitrate, aluminum tartrate, aluminum formate, aluminum chloride, aluminum sulfate and potassum aluminum sulfate may be used. The antibiotic may be added as the free base, the hydrochloride, the hydrobromide, the nitrate, the sulfate or as the sodium salt or other alkali metal salt, or as the calcium salt or other alkaline earth metal salt. Effectively, any form of aluminum which is ionizable and any form of the tetracycline antibiotics which gives the ionizable form of the antibiotic may be used in preparing the complexes.

The vehicle employed in preparing the parenteral solutions of antibiotic complex and glyceraldehyde of the present invention may be sterile water, physiological saline, physiological saline with dextrose, and the like. Preferably, however, the vehicle employed in the present invention is an aqueous solution of a physiologically acceptable glycol, such as propylene glycol, glycerol, isopropylidene glycerol, and polyethylene glycol. Stable solutions are prepared using concentrations of 30–80 percent of physiologically acceptable glycols, the preferred range being between 50–75 percent. When the concentration of organic solvent is less than 20 percent, a haze develops in the solution, which is not pharmaceutically acceptable for parenteral preparations. The composition may be prepared by dissolving the tetracycline antibiotic aluminum calcium gluconate complex and glyceraldehyde source in water and then adding the remainder of the vehicle. The final composition is then titrated to a pH of 7.5–9.5 using a basic substance. The neutralizing agents to be used are those which are water soluble and physiologically acceptable, and have a dissociation constant of greater than $10^{-5}$. Among the most useful neutralizing agents are the lower aliphatic amines, such as monoethanolamine, diethanolamine and triethanolamine. The preparation may also include local anesthetics, such as procaine and xylocaine, for the purpose of reducing discomfort at the site of the injection, in addition to the antioxidants and preservatives mentioned hereinabove.

For intramuscular administration, the concentration of antibiotic complex, calculated as the tetracycline antibiotic hydrochloride, is generally preferred at about 5% w./v. From this solution, convenient doses of one or two ml. are used for injection to deliver a therapeutic quantity of antibiotic. This volume is readily administered and well tolerated by patients. Solutions of lower concentrations of 2–3% are also useful, as are solutions of higher concentrations of up to about 15%, limited of course by the solubility of the specific antibiotic complex. Generally, the injection of stronger solutions of antibiotic may cause undue soreness at the cite of injection and weaker solutions require larger, less well-tolerated, volumes to be injected for an equivalent therapeutic dose. When used for intravenous infusion, solutions at any of the above concentrations can be used in the usual form by dilution with sterile water, physiological saline, and the like, before administration.

It is an advantage of the present invention that the concentration of glyceraldehyde is not unduly critical. High concentrations of glyceraldehyde improve the early blood levels, and even saturated solutions are effective, subject to practical limitations. A saturated solution of glyceraldehyde for all practical purposes, is about 25% w./v. At the lower range of concentration, as little as 5% w./v. of the glyceraldehyde enhances early blood level formation, but even smaller amounts may be beneficial. A range of about 10–20% glyceraldehyde w./v. is preferred for convenience and best results.

As in all blood level work, there is a considerable variation in response from one test animal to another just as there is from one human patient to another. Therefore, it is necessary to take averages of the blood levels obtained in all the animals in an experimental group. To further improve the reliability of animal tests, it is valuable to make cross-over studies in which the two groups of animals, i.e. "test" and "control," are interchanged in a subsequent repetition of the experiment, so that the same group of animals is exposed to both formulations.

The invention will be described in greater detail in conjunction with the following specific examples.

EXAMPLE 1

Tetracycline aluminum calcium gluconate (1:2:2:6)

1.5 grams of calcium hydroxide were suspended in 10 milliliters of water. Thereto was added 37.5 milliliters of aluminum gluconate (1:3) and the mixture was stirred for 20 minutes. To this clear solution was then added 4.8 grams of tetracycline (neutral), which dissolved within 5 minutes. After standing for one hour at room temperature, the solution was diluted to 96 milliliters, filtered to clarify, frozen and dried, yielding a tetracycline aluminum calcium gluconate complex. When reconstituted to the original volume, the solution had a tetracycline activity of 50 milligrams per milliliter and a pH of 4.4.

A complex having similar properties may be obtained over a wide range of proportions. Therapeutically useful injectable complexes have been formed as set forth in the above example on modifying the proportions in the following ratios of tetracycline to aluminum to calcium to gluconic acid:

| | |
|---|---|
| 1:1:1:3 | 1:2:1:6 |
| 1:1:1:6 | 1:2:2:6 |
| 1:1:2:6 | 1:2:1:9 |
| 1:2:2:9 | 1:4:1:6 |
| 1:2:3:9 | 1:4:2:6 |
| 1:2:4:10 | 1:4:3:6 |
| 1:1:3:6 | 1:4:1:10 |
| 1:1:1:9 | 1:4:2:10 |
| 1:1:2:9 | 1:4:3:10 |
| 1:1:3:9 | 1:4:4:10 |
| 1:1:4:9 | 1:4:5:12 |

EXAMPLE 2

Tetracycline aluminum calcium gluconate (1:4:1:6.6)

20 grams of a wet calcium tetracycline cake assaying 25% tetracycline as the hydrochloride were suspended in 70 milliliters of a solution of aluminum gluconate prepared from 8.2 grams of aluminum isopropoxide and 11.8 grams of glucono delta lactone. A clear solution with a pH of 4.2 was formed within five minutes. The solution was adjusted to a volume of 100 milliliters, filtered, filled into the vials and frozen. The tetracycline aluminum calcium gluconate was stored in a freezer until ready to be formulated, at which time it was melted and used.

EXAMPLE 3

Tetracycline aluminum calcium gluconate (1:4:5:12)

3.7 grams of calcium hydroxide were allowed to react overnight with 70 milliliters of aluminum gluconate solution prepared from 8.2 grams of aluminum isopropoxide and 21.4 grams of glucono delta lactone in water. 5.0 grams of neutral tetracycline were added which resulted in a clear solution within five minutes which solution has a pH of 5.05. The volume was adjusted to 100 milliliters to give a tetracycline concentration of approximately 50 milligrams per milliliter. The solution was frozen and dried. The thus prepared dry tetracycline aluminum calcium gluconate powder can be reconstituted by adding water for administration.

EXAMPLE 4

6-demethyltetracycline-aluminum-calcium-gluconate (1:4:5:12)

In 150 ml. of water were suspended, with stirring, 6.15 grams of 6-demethyltetracycline, 13.8 grams of glucono-δ-lactone, 20.0 grams of aluminum gluconate and 4.0 grams of calcium oxide. The suspension was stirred for half an hour or until an essentially clear solution was obtained. The solution was then filtered and poured into a solution of 2 liters of isopropanol plus 1 liter of petroleum ether (B.P. 60–80° C.). The resulting yellow precipitate was aged for half an hour, collected by filtration, washed with isopropanol, and dried in vacuo over $P_2O_5$ at 30° to 40° C. There was thus obtained 42.1 grams of the 6-demethyl-tetracycline-aluminum-calcium-gluconate complex.

EXAMPLE 5

7-dimethylamino-6-demethyl-6-deoxytetracycline-aluminum-calcium-gluconate (1:4:5:12)

In 175 ml. of water was suspended, with stirring 6.55 grams of 7-dimethylamino-6-demethyl - 6 - deoxytetracycline, 13.8 grams of glucono-δ-lactone, 20.0 grams of aluminum gluconate and 4.0 grams of calcium oxide. The suspension was stirred for half an hour or until an essentially clear solution was obtained. The solution was then filtered and poured into a solution of 2 liters of isopropanol plus 1 liter of petroleum ether (B.P. 60–80° C.). The resulting yellow precipitate was aged for half an hour, collected by filtration, washed with isopropanol, and dried in vacuo over $P_2O_5$ at 30° to 40° C. There was thus obtained 43.3 grams of the 7-dimethylamine-6-demethyl-6 - deoxytetracycline - aluminum-calcium-gluconate complex.

EXAMPLE 6

6-deoxytetracycline-aluminum-calcium-gluconate (1:4:5:12)

In 80 ml. of water were suspended 8.16 grams of aluminum isopropoxide and 21.4 grams of glucono-δ-lactone, and the resulting suspension was stirred for 8 hours. The reaction mixture was then aged at room temperature overnight. Then 4.3 grams of 6-deoxytetracycline neutral was suspended in 35 ml. of water and the suspension was added to the reaction mixture, with stirring. After 15 minutes, 2.8 grams of calcium oxide was suspended in 35 ml. of water and the suspension was added to the reaction mixture, with stirring. As soon as a clear solution was obtained, the reaction mixture was filtered and the filtrate poured into 4 liters of isopropanol. The resulting precipitate was removed by filtration and dried in vacuo. There was thus obtained 30.0 grams of the 6-deoxytetracycline-aluminum-calcium-gluconate complex.

EXAMPLE 7

6-deoxy-6-demethyltetracycline-aluminium-calcium-gluconate (1:4:5:12)

In 80 ml. of water were suspended 8.16 grams of aluminum isopropoxide and 21.4 grams of glucono-δ-lactone, and the filtrate poured into 4 liters of isopropanol. The reaction mixture was then aged at room temperature overnight. Then 4.14 grams of 6-deoxy-6-demethyltetracycline neutral was suspended in 35 ml. of water and the suspension was added to the reaction mixture, with stirring. After 15 minutes, 2.8 grams of calcium oxide was suspended in 35 ml. of water and the suspension was added to the reaction mixture, with stirring. As soon as a clear solution was obtained, the reaction mixture was filtered and the filtrate poured into 4 liters of isopropanol. The resulting precipitate was removed by filtration and dried in vacuo. There was thus obtained 29.0 grams of the 6 - deoxy - 6-demethyltetracycline-aluminum-calcium-gluconate complex.

EXAMPLE 8

6-methylene-6-demethyl-6-deoxytetracycline-aluminum-calcium-gluconate (1:4:4:9)

In 150 ml. of water was suspended with stirring 12.2 grams of aluminum isopropoxide and 32.0 grams of glucono-δ-lactone and the resulting suspension was stirred for 20 hours. The resulting essentially clear aluminum-gluconate solution was filtered, and to the filtrate was added with stirring 8.94 grams of 6-methylene-6-demethyl-6-deoxytetracycline suspended in 20 ml. of water. After 15 minutes, 4.5 grams of calcium oxide suspended in 20 ml. of water was added and stirring continued until a clear solution was again obtained. This was filtered and the filtrate poured into 2000 ml. of isopropanol. The resulting precipitate was removed by filtration and dried in vacuo. There was thus obtained 46 grams of the 6 - methylene-6-demethyl-6-deoxytetracycline-aluminum-calcium-gluconate complex.

EXAMPLE 9

7-chloro-6-demethyltetracycline-aluminum-calcium-gluconate (1:4:3:12)

In 100 ml. of water were suspended with stirring 8.16 grams of aluminum isopropoxide and 21.4 grams of glucono-δ-lactone and the resulting suspension was stirred overnight. The resulting essentially clear aluminum-gluconate solution was filtered, and to the filtrate was added with stirring 4.65 grams of 7-chloro-6-demethyltetracycline suspended in 20 ml. of water. After 15 minutes, 1.7 grams of calcium oxide suspended in 20 ml. of water was added and stirring continued until a clear solution was again obtained. The solution was then filtered and the filtrate poured into 1000 ml. of isopropanol. The resulting precipitate was removed by filtration and dried in vacuo. There was thus obtained 26.0 grams of the 7-chloro - 6 - demethyltetracycline-aluminum-calcium-gluconate complex.

EXAMPLE 10

7-chloro-6-demethyltetracycline-aluminum-calcium-gluconate (1:4:3:8)

In 100 ml. of water were suspended with stirring 16.3 grams of aluminum isopropoxide and 28.5 grams of glucono-δ-lactone and the resulting suspension was stirred overnight. The resulting essentially clear aluminum-gluconate solution was filtered, and to the filtrate was added with stirring 9.3 grams of 7-chloro-6-demethyltetracycline suspended in 20 ml. of water. After 15 minutes, 3.4 grams of calcium oxide suspended in 20 ml. of water was added and stirring continued until a clear solution was again obtained. The solution was then filtered and the filtrate poured into 2000 ml. of isopropanol. The resulting precipitate was removed by filtration and dried in vacuo. There was thus obtained 45 grams of the 7-chloro-6-demethyltetracycline-aluminum-calcium-gluconate complex.

EXAMPLE 11

5-hydroxytetracycline-aluminum-calcium-gluconate (1:4:2:12)

In 200 ml. of water were suspended with stirring 32.6 grams of aluminum isopropoxide and 85.6 grams of glucono-δ-lactone and the resulting suspension was stirred overnight. The resulting essentially clear aluminum-gluconate solution was filtered, and to the filtrate was added with stirring 18.4 grams of 5-hydroxytetracycline suspended in 50 ml. of water. After 15 minutes, 4.5 grams of calcium oxide suspended in 50 ml. of water was added and stirring continued until a clear solution was again obtained. The solution was then filtered and the filtrate poured into 4000 ml. of isopropanol. The resulting precipitate was removed by filtration and dried in vacuo. There was thus obtained 100 grams of the 5-hydroxytetracycline-aluminum-calcium-gluconate complex.

EXAMPLE 12

7-chloro-6-demethyltetracycline-aluminum-calcium-gluconate (1:4:2:9)

In 150 ml. of water were suspended with stirring 32.6 grams of aluminum isopropoxide and 64.1 grams of glucono-δ-lactone and the resulting suspension was stirred overnight. The resulting essentially clear aluminum-gluconate solution was filtered, and to the filtrate was added with stirring 18.6 grams of 7-chloro-6-demethyltetracycline suspended in 50 ml. of water. After 15 minutes, 4.5 grams of calcium oxide suspended in 50 ml. of water was added and stirring continued until a clear solution was again obtained. The solution was then filtered and the filtrate poured into 3000 ml. of isopropanol. The resulting precipitate was removed by filtration and dried in vacuo. There was thus obtained 95 grams of the 7-chloro-6-demethyltetracycline-aluminum - calcium-gluconate complex.

EXAMPLE 13

7-chloro-6-demethyltetracycline-aluminum-calcium-gluconate (1:4:1:12)

In 250 ml. of water were suspended with stirring 32.6 grams of aluminum isopropoxide and 85.6 grams of glucono-δ-lactone and the resulting suspension was stirred overnight. The resulting essentially clear aluminum-gluconate solution was filtered, and to the filtrate was added with stirring 18.6 grams of 7-chloro-6-demethyltetracyline suspended in 50 ml. of water. After 15 minutes, 2.4 grams of calcium oxide suspended in 50 ml. of water was added and stirring continued until a clear solution was again obtained. The solution was filtered and the filtrate frozen and lyophilized. There was thus obtained 119 grams of the 7-chloro-6-demethyltetracycline - aluminum - calcium-gluconate complex.

EXAMPLE 14

7-chloro-6-demethyltetracycline-aluminum-calcium-gluconate (1:3:1:6)

In 500 ml. of water were suspended with stirring 61.2 grams of aluminum isopropoxide and 106.8 grams of glucono-δ-lactone and the resulting suspension was stirred overnight. The resulting essentially clear aluminum-gluconate solution was filtered, and to the filtrate was added with stirring 46.5 grams of 7-chloro-6-demethyltetracycline suspended in 150 ml. of water. After 15 minutes, 5.6 grams of calcium oxide suspended in 150 ml. of water was added and stirring continued until a clear solution was again obtained. The solution was filtered and the filtrate frozen and lyophilized. There was then obtained 175 grams of the 7-chloro-6-demethyltetracycline-aluminum-calcium-gluconate complex.

EXAMPLE 15

7-chloro-6-demethyltetracycline-aluminum-calcium-gluconate (1:1:1:2)

In 75 ml. of water were suspended with stirring 2.04 grams of aluminum isopropxide and 2.56 grams of glucono-δ-lactone and the resulting suspension was stirred overnight. The resulting essentially clear aluminum-gluconate solution was filtered, and to the filtrate was added with stirring 4.65 grams of 7-chloro-6-demethyltetracycline suspended in 25 ml. of water. After 15 minutes, 0.6 gram of calcium oxide suspended in 25 ml. of water was added and stirring continued until a clear solution was again obtained. The solution was then filtered and the filtrate poured into 2000 ml. of isopropanol. The resulting precipitate was removed by filtration and dried in vacuo. There was thus obtained 4.8 grams of the 7-chloro-6-demethyltetracycline-aluminum - calcium-gluconate complex.

EXAMPLE 16

5-hydroxytetracycline-aluminum-calcium-gluconate (1:2:1:4)

In 75 ml. of water were suspended with stirring 4.08 grams of aluminum isopropoxide and 7.12 grams of glucono-δ-lactone and the resulting suspension was stirred overnight. The resulting essentially clear aluminum-gluconate solution was filtered, and to the filtrate was added with stirring 4.60 grams of 5-hydroxytetracycline suspended in 25 ml. of water. After 15 minutes, 0.6 gram of calcium oxide suspended in 25 ml. of water was added and stirring continued until a clear solution was again obtained. The solution was then filtered and the filtrate poured into 2000 ml. of isopropanol. The resulting precipitate was removed by filtration and dried in vacuo. There was thus obtained 12.0 grams of the 5-hydroxytetracycline-aluminum-calcium-gluconate complex.

EXAMPLE 17

7-chloro-6-demethyltetracycline-aluminum-calcium-gluconate (1:2:1:6)

In 75 ml. of water were suspended with stirring 4.08 grams of aluminum isopropoxide and 10.7 grams of glucono-δ-lactone and the resulting suspension was stirred overnight. The resulting essentially clear aluminum-gluconate solution was filtered, and to the filtrate was added with stirring 4.65 grams of 7-chloro-6-demethyltetracycline suspended in 25 ml. of water. After 15 minutes, 0.6 gram of calcium oxide suspended in 25 ml. of water was added and stirring continued until a clear solution was again obtained. The solution was then filtered and the filtrate poured into 2000 ml. of isopropanol. The resulting precipitate was removed by filtration and dried in vacuo. There was thus obtained 14.0 grams of the 7-chloro-6-demethyltetracycline-aluminum - calcium-gluconate complex.

EXAMPLE 18

6-deoxytetracycline-aluminum-calcium-gluconate (1:3:2:7)

In 100 ml. of water were suspended with stirring 12.2 grams of aluminum isopropoxide and 24.9 grams of glucono-δ-lactone and the resulting suspension was stirred overnight. The resulting essentially clear aluminum-gluconate solution was filtered, and to the filtrate was added with stirring 8.56 grams of 6-deoxytetracycline suspended in 25 ml. of water. After 15 minutes, 2.2 grams of calcium oxide suspended in 25 ml. of water was added and stirring continued until a clear solution was again obtained. The solution was then filtered and the filtrate poured into 2000 ml. of isopropanol. The resulting precipitate was removed by filtration and dried in vacuo. There was thus obtained 38.0 grams of 6-deoxytetracycline-aluminum-calcium-gluconate complex.

EXAMPLE 19

7-chloro-6-demethyltetracycline-aluminum-calcium-gluconate (1:2:2:6)

In 100 ml. of water were suspended with stirring 8.2 grams of aluminum isopropoxide and 21.4 grams of glucono-δ-lactone and the resulting suspension was stirred overnight. The resulting essentially clear aluminum-gluconate solution was filtered, and to the filtrate was added with stirring 9.3 grams of 7 - chloro-6-demethyltetracycline suspended in 20 ml. of water. After 15 minutes, 2.2 grams of calcium oxide suspended in 20 ml. of water was added and stirring continued until a clear solution was again obtained. The solution was then filtered and the filtrate poured into 2000 ml. of isopropanol. The resulting precipitate was removed by filtration and dried in vacuo. There was thus obtained 33.0 grams of the 7-chloro-6-demethyltetracycline-aluminum - calcium - gluconate complex.

EXAMPLE 20

7-chloro-6-demethyltetracycline-aluminum-calcium-gluconate (1:3:4:9)

In 150 ml. of water were suspended with stirring 12.2 grams of aluminum isopropoxide and 32.0 grams of glucono-δ-lactone and the resulting suspension was stirred overnight. The resulting essentially clear aluminum-gluconate solution was filtered, and to the filtrate was added with stirring 9.3 grams of 7-chloro-6-demethyltetracycline suspended in 25 ml. of water. After 15 minutes, 4.5 grams of calcium oxide suspended in 25 ml. of water was added and stirring continued until a clear solution was again obtained. The solution was then filtered and the filtrate poured into 2000 ml. of isopropanol. The resulting precipitate was removed by filtration and dried in vacuo. There was thus obtained 41.0 grams of the 7-chloro-6-demethyltetracycline-aluminum - calcium - gluconate complex.

EXAMPLE 21

7-dimethylamino-6-demethyl-6-deoxytetracycline-aluminum-calcium-gluconate (1:4:2:6)

In 90 ml. of water were suspended with stirring 8.16 grams of aluminum isopropoxide and 10.7 grams of glucono-δ-lactone and the resulting suspension was stirred overnight. The resulting essentially clear aluminum-gluconate solution was filtered, and to the filtrate was added with stirring 4.57 grams of 7-dimethylamino-6-demethyl-6-deoxytetracycline suspended in 20 ml. of water. After 15 minutes, 1.1 grams of calcium oxide suspended in 20 ml. of water was added and stirring continued until a clear solution was again obtained. The solution was then filtered and the filtrate poured into 3000 ml. of isopropanol. The resulting precipitate was removed by filtration and dried in vacuo. There was thus obtained 16.0 grams of the 7-dimethylamino-6-demethyl-6-deoxytetracycline-aluminum-calcium-gluconate complex.

EXAMPLE 22

7-chlorotetracycline-aluminum-calcium-gluconate (1:4:1.5:12)

In 350 ml. of water were suspended with stirring 81.6 grams of aluminum isopropoxide and 213.6 grams of glucono-δ-lactone and the resulting suspension was stirred overnight. The resulting essentially clear aluminum-gluconate solution was filtered, and to the filtrate was added with stirring 47.9 grams of 7-chlorotetracycline suspended in 100 ml. of water. After 15 minutes, 8.4 grams of calcium oxide suspended in 50 ml. of water was added and stirring continued until a clear solution was again obtained. The solution was then filtered and the filtrate poured into 6000 ml. of isopropanol. The resulting precipitate was removed by filtration and dried in vacuo. There was thus obtained 275 grams of the 7-chlorotetracycline-aluminum-calcium-gluconate complex.

EXAMPLE 23

6-demethyltetracycline-aluminum-calcium-gluconate (1:3:1:6)

In 300 ml. of water were suspended with stirring 30.6 grams of aluminum isopropoxide and 53.4 grams of glucono-δ-lactone and the resulting suspension was stirred overnight. The resulting essentially clear aluminum-gluconate solution was filtered, and to the filtrate was added with stirring 21.5 grams of 6-demethyltetracycline suspended in 100 ml. of water. After 15 minutes, 2.8 grams of calcium oxide suspended in 100 ml. of water was added and stirring continued until a clear solution was again obtained. The solution was filtered and the filtrate frozen and lyophilized. There was thus obtained 86 grams of the 6 - demethyltetracycline-aluminum-calcium-gluconate complex.

EXAMPLE 24

6-demethyltetracycline-aluminum-calcium-gluconate (1:4:1:12)

In 300 ml. of water were suspended with stirring 40.8 grams of aluminum isopropoxide and 106.8 grams of glucono-δ-lactone and the resulting suspension was stirred overnight. The resulting essentially clear aluminum-gluconate solution was filtered, and to the filtrate was added with stirring 21.5 grams of 6-demethyltetracycline suspended in 100 ml. of water. After 15 minutes, 2.8 grams of calcium oxide suspended in 100 ml. of water was added and stirring continued until a clear solution was again obtained. The solution was filtered and the filtrate frozen and lyophilized. There was thus obtained 148 grams of the 6 - demethyltetracycline-aluminum-calcium-gluconate complex.

EXAMPLE 25

Concentration of aqueous glyceraldehyde solution

Approximately 150 ml. of a 40% aqueous glyceraldehyde solution was evaporated to dryness in vacuo yielding a very thick gum. The I.R. of this gum had a very weak aldehyde carbonyl band indicating that the bulk of the material was in the dimer or higher polymer form. The gum was dissolved in hot ethanol and the solution allowed to cool overnight. The solid product was removed by filtration, washed with ethanol and dried. Yield 3.7 grams. A second crop of 2.7 grams was added to the first crop. A third crop of 5.8 grams was also added.

EXAMPLE 26

Tetracycline blood levels with glyceraldehyde

The following samples were administered intramuscularly in dogs and blood level studies were made:

(A)

Tetracycline-Al-Ca-Gluconate (1:3:1:6) 5% solution w./v. at TC·HCl—50 ml.
Glyceraldehyde from Example 25 20% solution w./v.—12.1 g.

(B)

Tetracycline-Al-Ca-Gluconate (1:3:1:6) 5% solution w./v. at TC·HCl—50 ml.

both diluted with 60% aqueous propylene glycol to equal volume which acted as a control. In each case the dose was 7:5 mg. (calculated as TC·HCl) per pound of dog weight. Blood levels measured are shown in the following table.

TABLE 1

| A. With glyceraldehyde, Dog. No. | Blood levels (γ/ml.) | | |
|---|---|---|---|
| | 1 hr. | 4 hr. | 7 hr. |
| 451 | 17.8 | 5.90 | 4.13 |
| 3571 | 17.1 | 9.20 | 5.30 |
| 2012 | 18.9 | 9.00 | 5.90 |
| 1394 | 12.6 | 9.90 | 6.00 |
| 181 | 17.1 | 12.8 | 6.00 |
| 91 | 18.9 | 9.90 | 6.50 |
| Average | 17.1 | 9.45 | 5.64 |

| B. Controls, Dog. No. | Blood levels (γ/ml.) | | |
|---|---|---|---|
| | 1 hr. | 4 hr. | 7 hr. |
| 559 | 3.90 | 9.90 | 5.70 |
| 4756 | 3.00 | 8.20 | 6.00 |
| 669 | 3.20 | 13.2 | 12.0 |
| 3868 | 13.2 | 9.00 | 6.60 |
| 786 | 19.2 | 8.40 | 5.60 |
| 865 | 16.8 | 11.1 | 5.40 |
| Average | 9.88 | 9.97 | 6.88 |

It will be seen that on the average the blood level at one hour was nearly twice as great with the glyceraldehyde containing solutions as in the controls and the levels were more uniformly high. At four hours the blood levels were approximately the same and had fallen at seven hours somewhat for those receiving glyceraldehyde containing solutions.

EXAMPLE 27

Tetracycline blood levels: Cross-over studies

A blood level crossover experiment was conducted with 10 dogs, first measuring blood levels with the glyceraldehyde composition and then with the control for each dog. The dosage was only one-third that used in Example 26, being 2.5 mg. per pound of dog weight instead of 7.5 mg., and using a solution as prepared in Example 26 containing 10% w./v. of glyceraldehyde. The control is a solution of the same strength (5% w./v. as TC·HCl), without glyceraldehyde. Both solutions are in 60% aqueous propylene glycol. Dose 2.5 mg. as TC·HCl/pound dog weight. The result of studies on 10 dogs are as follows in Table 2:

TABLE 2.—BLOOD LEVELS (γ/ml.)

| Dog No. | 1 hour | | 2 hours | | 4 hours | | 7 hours | |
|---|---|---|---|---|---|---|---|---|
| | Control | Glyceraldehyde | Control | Glyceraldehyde | Control | Glyceraldehyde | Control | Glyceraldehyde |
| 1394 | 2.40 | 5.25 | 3.20 | 3.36 | 2.30 | 2.24 | 1.10 | 1.29 |
| 451 | 2.72 | 2.00 | 3.12 | 2.96 | 2.31 | 2.19 | 1.10 | 1.44 |
| 181 | 4.16 | 6.30 | 4.24 | 3.92 | 3.08 | 2.34 | 1.95 | 1.74 |
| 969 | 3.52 | 3.60 | 2.44 | 2.64 | | 1.47 | 0.95 | 1.02 |
| 4221 | 3.76 | 3.25 | 3.04 | 2.92 | 1.82 | 1.80 | 0.98 | 1.35 |
| 669 | 3.83 | 3.84 | 3.92 | 3.76 | 2.82 | 2.45 | 1.74 | 1.50 |
| 1455 | 1.60 | 2.44 | 2.88 | 3.28 | 2.82 | 2.38 | 1.14 | 1.40 |
| 2314 | 1.25 | 3.28 | 2.88 | 3.28 | 2.46 | 2.17 | 1.28 | 1.22 |
| 868 | 5.40 | 4.00 | 3.20 | 3.12 | 1.92 | 2.03 | 1.23 | 1.35 |
| 2393 | 1.20 | 4.40 | 2.32 | 2.40 | 2.22 | 1.82 | 1.47 | 1.20 |
| Average | 2.98 | 3.84 | 3.12 | 3.16 | 2.42 | 2.09 | 1.29 | 1.35 |

It will be noted that in addition to giving higher early blood levels, 5 of the 10 dogs tested peaked earlier with the glyceraldehyde formula than with the control, 9 out of 10 peaking at the first hour.

EXAMPLE 28

Analysis of another crossover experiment

Using a solution of 7-chloro-6-demethyltetracycline aluminum calcium gluconate (1:3:1:6) complex as prepared in Example 26 containing 10% w./v. of glyceraldehyde. The control is a solution of demethylchlortetracycline aluminum calcium gluconate complex of the same strength (5% w./v. as demethylchlortetracycline·HCl), without glyceraldehyde. Both solutions are in 60% aqueous propylene glycol. Dose 2.5 mg. calculated as demethylchlortetracycline·HCl/pound dog weight. (pH about 8.5.) The results are set forth in Table 3 below.

TABLE 3.—Blood Levels (γ/ml.)

| Dog No. | 1 hour | | 2 hours | | 4 hours | | 7 hours | |
|---|---|---|---|---|---|---|---|---|
| | Control | Glyceraldehyde | Control | Glyceraldehyde | Control | Glyceraldehyde | Control | Glyceraldehyde |
| 969 | 2.00 | 1.26 | 1.44 | 2.70 | 0.88 | 1.92 | 0.57 | 0.87 |
| 2303 | 2.55 | 4.00 | 1.68 | 2.70 | 1.08 | 1.34 | 0.66 | 0.87 |
| 6826 | 0.55 | 3.50 | 0.71 | 2.70 | 0.85 | 1.50 | 0.60 | 1.10 |
| 639 | 2.00 | 4.70 | 1.44 | 3.00 | 0.73 | 1.52 | 0.51 | 1.10 |
| 6579 | 1.27 | 3.00 | 1.04 | 2.10 | 0.56 | 1.29 | 0.57 | 0.81 |
| 6113 | 3.20 | 1.95 | 2.20 | 2.10 | 1.30 | 1.44 | 1.11 | 0.91 |
| 181 | 3.52 | 5.10 | 2.60 | 4.80 | 1.41 | 2.70 | 0.83 | 3.10 |
| 6827 | 1.50 | 6.00 | 1.70 | 4.48 | 1.28 | 3.20 | 0.68 | 2.30 |
| 2 | 5.85 | 7.40 | 4.00 | 5.28 | 2.36 | 4.10 | 1.55 | 3.60 |
| 4471 | 1.58 | 4.80 | 1.80 | 4.48 | 1.10 | 3.00 | 0.68 | 1.95 |
| 4252 | 3.30 | 3.70 | 2.45 | 4.24 | 1.50 | 3.75 | 0.98 | 1.70 |
| 1750 | 3.08 | 4.10 | 2.25 | 3.12 | 1.08 | 2.25 | 0.63 | 1.20 |
| Average | 2.54 | 4.12 | 1.94 | 3.48 | 1.18 | 2.34 | 0.78 | 1.62 |

10 dogs gave higher early levels with glyceraldehyde.
1 dog was about the same.
1 dog gave higher early levels without glyceraldehyde.

EXAMPLE 29

Analysis of a further blood level crossover experiment

Using a solution of 6-demethyltetracycline aluminum calcium gluconate (1:3:1:6) complex as prepared in Example 26 containing 10% w./v. of glyceraldehyde. The control is a solution of 6-demethyltetracycline aluminum calcium gluconate complex of the same strength (5% w./v. as 6-demethyltetracycline·HCl) without glyceraldehyde. Both solutions are in 60% aqueous propylene glycol. Dose 2.5 mg. as 6-demethyltetracycline·HCl/pound dog weight. (pH about 8.5.) As is seen in the following Table 4, the average early blood levels are higher when using the glyceraldehyde formulation.

TABLE 4.—Blood Levels (γ/ml.)

| Dog No. | 1 hour | | 2 hours | | 4 hours | | 7 hours | |
|---|---|---|---|---|---|---|---|---|
| | Control | Glyceraldehyde | Control | Glyceraldehyde | Control | Glyceraldehyde | Control | Glyceraldehyde |
| 677 | 1.75 | 4.32 | 2.38 | 2.82 | 1.92 | 1.58 | 1.11 | 0.96 |
| 3051 | 1.00 | 4.32 | 2.13 | 2.52 | 2.32 | 1.36 | 1.62 | 0.72 |
| 977 | 2.38 | 3.80 | 3.64 | 2.88 | 2.24 | 2.04 | 1.35 | 1.13 |
| 3035 | 1.80 | 3.00 | 2.22 | 2.48 | 1.40 | 1.30 | 0.57 | 0.72 |
| 5774 | 5.40 | 5.50 | 3.54 | 4.56 | 2.00 | 2.40 | 1.05 | 1.56 |
| 1750 | 3.84 | 3.50 | 2.34 | 2.56 | 1.04 | 1.84 | 0.57 | 0.98 |
| Average | 2.70 | 4.08 | 2.71 | 2.97 | 1.82 | 1.76 | 1.04 | 1.02 |

EXAMPLE 30

Other formulations using tetracycline

Similar enhancements of early blood levels are obtained when using solutions of tetracycline aluminum calcium gluconate (1:3:1:6) complex, as prepared in Example 26, containing 7.5% and 15% glyceraldehyde w./v., respectively. The control in each case is a solution of tetracycline aluminum calcium gluconate complex of the same strength (5% w./v. as tetracycline·HCl) without glyceraldehyde. The dose in each case is 2.5 mg. as tetracycline·HCl per pound of dog weight.

EXAMPLE 31

Formulations using other tetracyclines

Similar enhancements of early blood levels are obtained when using solutions of 5-hydroxytetracycline aluminum calcium gluconate (1:2:1:4) complex, 6-deoxytetracycline aluminum calcium gluconate (1:3:2:7) complex and 7-dimethylamino-6-demethyl-6-deoxytetracycline aluminum calcium gluconate (1:4:5:12) complex, as prepared in Example 26, containing 25% (approaching saturation) of glyceraldehyde. The control in each case is a solution of the specific tetracycline aluminum calcium gluconate complex of the same strength (5% w./v. as tetracycline·HCl) without glyceraldehyde. The dose, in each case, is 2.5 mg. as tetracycline·HCl, per pound of dog weight.

EXAMPLE 32

Tetracycline-aluminum-calcium-gluconate formulation

To 1.2 ml. of propylene glycol was added 375 mg. (100 mg. tetracycline HCl equivalents) of tetracycline-aluminum-calcium-gluconate (1:3:1:6) complex and sufficient water to afford solution. To this solution was added 200 mg. of glyceraldehyde, 10 mg. of sodium formaldehyde sulfoxylate, and enough 2-aminoethanol to raise the pH to 8.5. The solution volume was finally adjusted to 2.0 ml. with water. This solution can be used immediately or stored in a suitable container for use at a later time.

EXAMPLE 33

6-demethyltetracycline-aluminum-calcium-gluconate formulation

To 250 ml. of hot water was added 130.4 g. of glucono-delta-lactone and 34.8 g. of aluminum hydroxide dried gel. To the resulting clear solution was added 8.64 g. of calcium hydroxide suspended in 50 ml. of water. As soon as the mixture became clear it was cooled and 30 ml. of 2-aminoethanol and 550 ml. of propylene glycol was added. To the cool solution was added 53.5 g. of 6-demethyltetracycline suspended in 120 ml. of water and 650 ml. of propylene glycol, 10 g. of sodium formaldehyde sulfoxylate dissolved in 20 ml. of water, and 300 g. of glyceraldehyde. The pH was then adjusted to 8.5 and the volume to 2000 ml. After sterilization the formulation is filled into suitable containers.

EXAMPLE 34

7-dimethylamino-6-demethyl-6-deoxytetracycline-aluminum-calcium-gluconate formulation A mixture of 392 mg. of 7-dimethylamino-6-demethyl-6 - deoxytetracycline - aluminum - calcium - gluconate (1:4:2:6) and 400 mg. of glyceraldehyde was prepared. This physical mixture can be dissolved in 1.8 ml. of water or any other aqueous glycol mixture such as polyethylene or propylene glycol suitable for parenteral use.

What is claimed is:

1. A solution for intramuscular and intravenous administration comprising an aluminum calcium gluconate complex of tetracycline and from about 10% to about 20% on a weight/volume basis of glyceraldehyde dissolved in an aqueous propylene glycol solution having from 50% to 75% by weight of propylene glycol; the components of said complex being present in the molar ratio of tetracycline to aluminum to calcium to gluconic acid of 1:3:1:6 and said complex being present in a concentration of about 5% on a weight/volume basis calculated as tetracycline hydrochloride.

2. A solution for intramuscular and intravenous administration comprising an aluminum calcium gluconate complex of 6-demthyltetracycline and from about 10% to about 20% on a weight/volume basis of glyceraldehyde dissolved in an aqueous propylene glycol solution having from 50% to 75% by weight of propylene glycol; the component of said complex being present in the molar ratio of 6-demethyltetracycline to aluminum to calcium to gluconic acid of 1:3:1:6 and said complex being present in a concentration of about 5% on a weight/volume basis calculated as 6-demethyltetracycline hydrochloride.

3. A solution for intramuscular and intravenous administration comprising an aluminum calcium gluconate complex of 7-chloro-6-demethyltetracycline and from about 10% to about 20% on a weight/volume basis of glyceraldehyde dissolved in an aqueous propylene glycol solution having from 50% to 75% by weight of propylene glycol; the components of said complex being present in the molar ratio of 7-chloro-6-demethyltetracycline to aluminum to calcium to gluconic acid of 1:3:1:6 and said complex being present in a concentration of about 5% on a weight/volume basis calculated as 7-chloro-6-demethyltetracycline hydrochloride.

References Cited
UNITED STATES PATENTS

| | | | |
|---|---|---|---|
| 2,736,725 | 2/1956 | Ritter | 424—227 |
| 3,138,529 | 6/1964 | Takesue | 424—227 |
| 3,162,576 | 12/1964 | Glenn | 424—227 |
| 3,166,474 | 1/1965 | Sieger et al. | 424—227 |

JEROME D. GOLDBERG, Primary Examiner